(12) United States Patent
Gotz

(10) Patent No.: US 9,017,202 B2
(45) Date of Patent: Apr. 28, 2015

(54) DRIVE TRAIN

(71) Applicant: Andreas Gotz, Rastatt (DE)

(72) Inventor: Andreas Gotz, Rastatt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/775,137

(22) Filed: Feb. 23, 2013

(65) Prior Publication Data

US 2013/0274047 A1 Oct. 17, 2013

(51) Int. Cl.
| | |
|---|---|
| *B60K 6/365* | (2007.10) |
| *F16H 37/06* | (2006.01) |
| *B60K 6/383* | (2007.10) |
| *B60K 6/485* | (2007.10) |
| *B60K 17/26* | (2006.01) |
| *F16D 41/08* | (2006.01) |
| *F16D 47/04* | (2006.01) |
| *F16H 61/00* | (2006.01) |
| *B60K 6/26* | (2007.10) |
| *B60K 25/00* | (2006.01) |
| *F16H 57/04* | (2010.01) |

(52) U.S. Cl.
CPC ............. *F16H 37/065* (2013.01); *B60K 6/383* (2013.01); *B60K 6/485* (2013.01); *B60K 17/26* (2013.01); *B60K 2006/262* (2013.01); *B60K 2025/005* (2013.01); *F16D 41/088* (2013.01); *F16D 47/04* (2013.01); *F16H 57/0439* (2013.01); *F16H 61/0028* (2013.01); *Y02T 10/6226* (2013.01)

(58) Field of Classification Search
CPC .................... F16H 2048/202; F16H 2048/343; B60K 6/365
See application file for complete search history.

(56) References Cited

U.S. PATENT DOCUMENTS

| | | | |
|---|---|---|---|
| 6,746,354 B1 * | 6/2004 | Ziemer | 475/5 |
| 7,828,096 B2 * | 11/2010 | Hoher et al. | 475/5 |
| 2005/0187066 A1 | 8/2005 | Moses et al. | 477/2 |
| 2007/0149338 A1 | 6/2007 | Ebner et al. | 475/116 |

FOREIGN PATENT DOCUMENTS

| | | |
|---|---|---|
| DE | 199 23 316 A1 | 11/2000 |
| DE | 10 2007 043 737 A1 | 3/2009 |
| WO | WO 2006/012995 A1 | 2/2006 |
| WO | WO 2006/089376 A1 | 8/2006 |

\* cited by examiner

*Primary Examiner* — Robert A Siconolfi
*Assistant Examiner* — Huan Le
(74) *Attorney, Agent, or Firm* — Alfred J. Mangels

(57) ABSTRACT

A drive train for a motor vehicle, in particular a hybrid vehicle, having a drive shaft that can be connected to an internal combustion engine, and a transmission oil pump that can be coupled to the drive shaft by means of a switchable freewheel. An electrical machine for driving the transmission oil pump is also provided and is arranged in the power flow direction between the drive shaft and the transmission oil pump, and is in parallel to the freewheel in the power flow direction. A second freewheel is unnecessary and thereby reduces the construction space needed for the power train.

11 Claims, 3 Drawing Sheets

DRIVE TRAIN

CROSS-REFERENCE TO RELATED APPLICATION

This application is a continuation of International Application Serial No. PCT/DE2011/001513, having an international filing date of 26 Jul. 2011, and designating the United States, the entire contents of which are hereby incorporated by reference to the same extent as if fully rewritten.

BACKGROUND OF THE INVENTION

1. Field of the Invention

The present invention relates to a drive train for a motor vehicle, in which a torque of a drive unit can be transferred to a motor vehicle transmission as well as to a pump, in particular a transmission oil pump for acting hydraulically on the motor vehicle transmission.

2. Description of the Related Art

A drive train is known from WO 2006/012995 A1, in which an internal combustion engine is connected to a drive shaft, wherein the drive shaft can be coupled through a first freewheel to a pump shaft of a transmission oil pump. An electrical machine can be coupled through a second freewheel to the pump shaft of the transmission oil pump. Depending upon whether the internal combustion engine or the electrical machine provides a greater rotational speed for the pump shaft, either the internal combustion engine or the electrical machine is coupled to the pump shaft through the freewheel, such that an adequate supply of oil for a motor vehicle transmission by the transmission oil pump can be ensured.

A disadvantage of such a drive train is that the structural linkage of the transmission oil pump necessitates a comparatively large construction space, and the energy efficiency of the drive train is still insufficient.

An object of the present invention is to provide a drive train for a motor vehicle in which a pump, in particular a transmission oil pump, can be linked by a simple structural arrangement. In particular, it is an object of the present invention to increase the possibilities for utilization of the electrical machine of the drive train and/or to improve the energy efficiency of the drive train.

SUMMARY OF THE INVENTION

A drive train in accordance with the present invention for a motor vehicle, in particular a hybrid vehicle, has a drive shaft that can be connected to an internal combustion engine, and a pump, in particular a transmission oil pump, that can be coupled to the drive shaft by means of a freewheel, which in particular can be switched. An electrical machine for driving the pump is also provided. According to the present invention, the electrical machine is arranged in the flow line of power direction between the drive shaft and the pump, and is in parallel in the flow of power direction to the freewheel.

Situating the electrical machine parallel to the freewheel between the drive shaft and the pump makes it possible to realize a power stream exclusively from the internal combustion engine through the freewheel, exclusively through the electrical machine, or both through the internal combustion engine and through the electrical machine. This makes it possible, in particular in the case of a motor vehicle having automatic starting and stopping, to achieve a linking of the transmission oil pump to the drive shaft that is optimized for speed and power, depending on the operating system. In addition, the energy efficiency of the drive train can be improved by variable adjustment of the pump speed. It is not necessary to link the internal combustion engine and the electrical machine to the drive shaft by means of separate freewheels for each, so that the construction space required by the drive train can be reduced by eliminating the second parallel-switched freewheel. Furthermore, it is possible to operate the pump purely electrically, for example with the internal combustion engine turned off, in which case the freewheel is overrun in this operating state and interrupts a flow of power between the internal combustion engine and the pump past the electrical machine. During purely mechanical operation, i.e., when power is not applied to the electrical machine, the freewheel can lock up and provide a flow of power via the freewheel. In this operating state, a rotor and a stator of the electrical machine can also rotate at substantially the same speed, so that power is neither demanded from the electrical machine nor is power withdrawn by the electrical machine. In addition, boost operation is possible, in which in addition to the internal combustion engine the electrical machine can also transmit power to the pump. In this operating state, which can be employed, for example, at low speed of the internal combustion engine or when idling, the stator of the electrical machine can rotate together with the speed of the drive shaft, and by means of the delivered electric power can bring about an additional increase of the speed of the pump shaft connected to the pump, which is coupled to the rotor of the electrical machine. Since a comparatively high speed can be applied to the pump even when a low speed is provided by the internal combustion engine, the pump can be dimensioned correspondingly smaller and can provide the necessary flow volume with the aid of the increased speed. This makes it possible to construct the pump smaller and more compactly, so that less space is required for the drive train.

In a preferred embodiment, a switching element, in particular a centrifugal clutch, is situated in series with the freewheel in the flow of power direction and parallel to the electrical machine in the flow of power direction. By means of the centrifugal clutch, when the freewheel is locked, i.e., when there is a mechanical flow of power from the internal combustion engine to the pump, an interruption of the flow of power is realized when a particular limiting speed is reached. That prevents the pump from being subjected unintentionally to an excessive speed, which could result, for example, in damage to the pump or in unnecessarily high wear of the pump. In particular, it is possible, when an especially high rotational speed is provided by the internal combustion engine, to avoid an unnecessarily high flow volume of the pump. That ensures that the pump pumps only as much volume as is needed, so that an unnecessary circulating flow volume is avoided. Losses in efficiency are reduced thereby, and the energy efficiency of the drive train is increased. At the same time, at an appropriately high rotational speed of the drive shaft and the pump shaft, the centrifugal clutch disengages in order to operate the electrical machine in generator mode ("recuperation"). This can increase the functionality of the electrical machine significantly, and can be used for different possibilities of utilization. For example, it is possible to operate a conventional drive motor of the pump in generator mode, in order to obtain electrical energy that is not needed for the proper operation of the pump in the present operating state. As an alternative to the centrifugal clutch, a different switching element can also be used to optionally couple or uncouple the freewheel. For example, an electrically operated clutch can be provided as a switching element, in which case the rotational speed can be measured with a speed sensor connected to the clutch, and the freewheel can be coupled or uncoupled depending on a predefined threshold speed. This makes it possible in particular, by means of suitable software, to set the threshold speed differently for different construction types of drive trains, and/or to vary it during operation depending on the situation.

In particular, below a speed $n_{limit}$ of the drive shaft the switching element is closed to provide a flow of power, and above the speed $n_{limit}$ of the drive shaft it is open to interrupt a flow of power. Hence, the switching element in the form of a centrifugal clutch is able to switch the freewheel depending on the speed of rotation. Preferably, the speed $n_{limit}$ of the drive shaft is chosen so that a predefined maximum necessary pumping capacity of the pump is reached at the speed $n_{limit}$ of the drive shaft. That makes it possible to ensure proper operation of the pump, while mechanical energy that is not necessary for the proper operation of the pump is not consumed, so that this part of the energy can be used elsewhere. The efficiency of the drive train is thereby improved. The freewheel can be switched directly thereby. The switching of the freewheel can be effected, for example, by means of the electrical activation or the torque of the electrical machine. A freely switchable freewheel can determine particularly flexibly the operating point at which the freewheel is unlocked.

Especially preferably, the rotational speed ratio of the drive shaft is increased or reduced ahead of the pump in the flow of power direction. The additional increase or reduction of the speed ratio for the pump makes it possible to adapt and optimize the necessary dimensioning of the electrical machine and of the pump. For example, an additional increase in ratio makes a greater speed possible for the pump shaft of the pump, so that the pump can be dimensioned smaller. Furthermore, a decrease in ratio enables lower torques in the electrical machine, so that the electrical machine can be dimensioned smaller and save construction space.

In particular, the drive shaft is coupled with the pump through a planetary gear set for speed variation. With the aid of the planetary gear set, the speed of the drive shaft for operating the pump can be varied essentially steplessly, in order to achieve an increase or reduction in ratio.

Preferably, the drive shaft is connected to a ring gear of the planetary gear set, while the electrical machine is connected to the ring gear and a sun gear of the planetary gear set, the pump being connected to a planet carrier of the planetary gear set. This, with the aid of the planetary gear set, enables an increase in ratio of the rotational speed provided by the internal combustion engine via the drive shaft. It is also possible to integrate the electrical machine, the freewheel and/or the switching element into the planetary gear set, so that the required construction space is correspondingly small. For example, it is sufficient to extend the ring gear and/or the sun gear in the axial direction, in order to be able to link the rotor and the stator of the electrical machine, as well as the freewheel and/or the centrifugal clutch.

In another embodiment, the drive shaft is connected to a ring gear of the planetary gear set, while the electrical machine is connected to the ring gear and a planet carrier of the planetary gear set, the pump being connected to a sun gear of the planetary gear set. This, with the aid of the planetary gear set, enables a reduction in ratio of the rotational speed of the drive shaft. Furthermore, the electrical machine, as well as the freewheel and the switching element can be integrated simply into the planetary gear set, for example by extending the ring gear and/or the planet carrier in the axial direction in order to link the electrical machine, the freewheel, and/or the centrifugal clutch.

Especially preferably, the freewheel, and possibly a switching element provided in series with the freewheel, are connected to the electrical machine in parallel to the planetary gear set. The freewheel, and the possibly provided switching element, can thus be linked to the same functional elements of the planetary gear set as the electrical machine. That makes it possible to achieve parallel arrangement of the electrical machine with the freewheel and the possibly provided centrifugal clutch especially simply. To this end, the corresponding components of the planetary gear set can be extended correspondingly in the axial direction, in order to be able to link the rotor and the stator of the electrical machine, as well as the freewheel and/or the centrifugal clutch.

In particular, the freewheel disengages to interrupt the flow of power when the speed of the drive shaft is lower than the speed of a shaft that can be coupled by means of the freewheel, where the freewheel otherwise locks to provide a flow of power. The effect of this is that the internal combustion engine is able to drive the pump, but the pump does not attempt to drive the internal combustion engine. In particular, when the pump is operated by means of the electrical machine by means of electrical energy, the freewheel prevents the electrical energy provided by the electrical machine from being used for operating drive train, although the internal combustion engine supplies sufficient power.

The present invention also relates to a motor vehicle, in particular a hybrid vehicle having an internal combustion engine and a vehicle transmission, where the internal combustion engine is connected to the vehicle transmission by means of a drive train, wherein the drive train can be designed and refined as described above. Because of the smaller construction space requirement of the drive train and the improved efficiency, the motor vehicle can be operated more energy efficiently and can make additional construction space available for additional components.

BRIEF DESCRIPTION OF THE DRAWINGS

Embodiments of the present invention will be described below, referring to the accompanying drawings. The drawing figures show the following.

DESCRIPTION OF THE PREFERRED EMBODIMENTS

Figure 1:
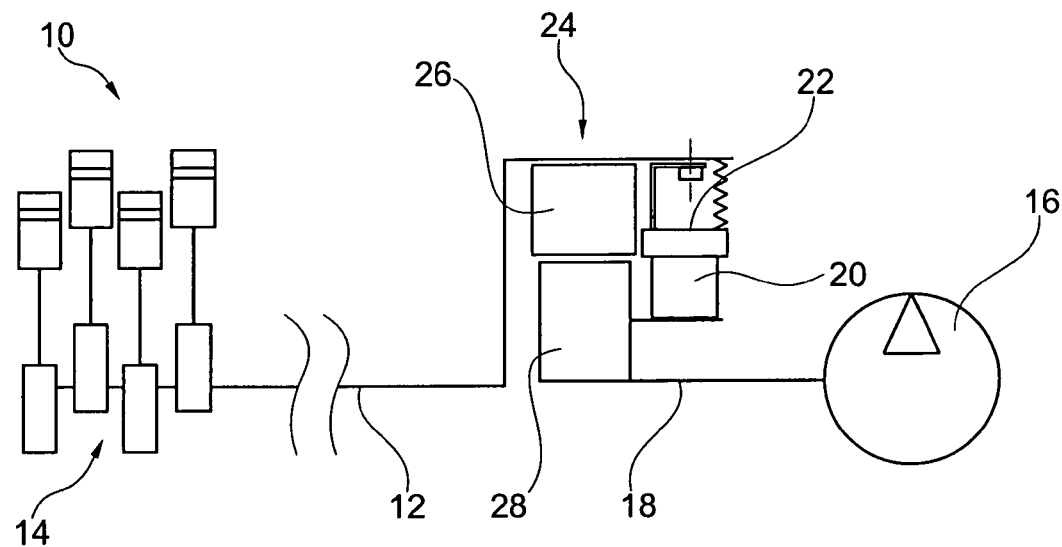
FIG. 1: a schematic representation of a drive train according to a first embodiment of the present invention.

The drive train 10 depicted in FIG. 1 has a drive shaft 12, which is coupled with an internal combustion engine 14. Also provided is a pump designed as a transmission oil pump 16, which can be coupled with drive shaft 12 by means of a pump shaft 18. To this end, shaft 18 can be coupled through a freewheel 20 to drive shaft 12. In the depicted exemplary embodiment, in the power flow line with freewheel 20, a switching element designed as centrifugal clutch 22 is provided, which interrupts a flow of power from drive shaft 12 to transmission oil pump 16 above a certain rotational speed. Also provided, and in the flow of power direction parallel to freewheel 20 and to centrifugal clutch 22, is an electrical machine 24. The order of freewheel 20 and centrifugal clutch 22 can also be exchanged. Electrical machine 24 has a stator 26, which is connected to drive shaft 12 in a rotationally fixed connection. Stator 26 can optionally be powered by, for example, a motor vehicle battery. In addition, electrical machine 24 has a rotor 28, which is connected to pump shaft 18 of transmission oil pump 16 in a rotationally fixed connection. Driving energy for transmission oil pump 16 can be provided by means of electrical machine 24, in addition to or alternatively to driving energy from internal combustion engine 14. Furthermore, when centrifugal clutch 22 is disengaged, transmission oil pump 16 can operate electrical machine 24 in generator mode, in order to produce electrical energy.

Figure 2:
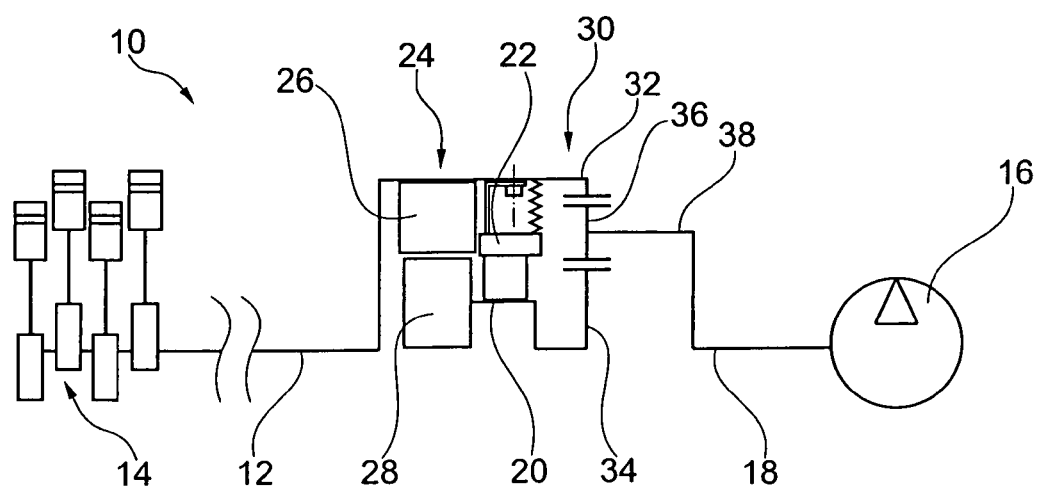
FIG. 2: a schematic representation of a drive train according to a second embodiment of the present invention.

In the embodiment of drive train 10 depicted in FIG. 2, in comparison to the embodiment of drive train 10 depicted in FIG. 1, in addition a planetary gear set 30 is provided, with the aid of which the speed ratio of drive shaft 12 can be increased in comparison to the speed of pump shaft 18 of transmission oil pump 16. In the depicted exemplary embodiment, drive shaft 12 is connected to a ring gear 32, so that electrical machine 24, as well as freewheel 20 and centrifugal clutch 22 are also connected to ring gear 32. Furthermore, electrical machine 24, as well as freewheel 20 and centrifugal clutch 22, can be coupled with a sun gear 34 of planetary gear set 30. The order of freewheel 20 and centrifugal clutch 22 can also be exchanged. Engaged with ring gear 32 and sun gear 34 is a planet gear 36, which is connected to pump shaft 18 of transmission oil pump 16 by means of a planet carrier 38.

Figure 3:
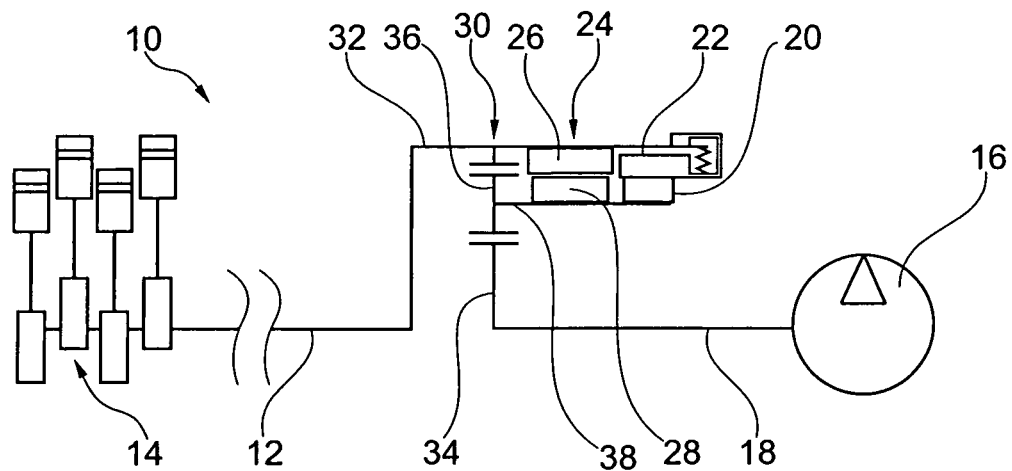
FIG. 3: a schematic representation of drive train according to a third embodiment of the present invention.

In the embodiment of drive train 10 depicted in FIG. 3, in comparison to the embodiment of drive train 10 depicted in FIG. 2, electrical machine 24, as well as freewheel 20 and centrifugal clutch 22, are not coupled with sun gear 34 but with planet carrier 38. Pump shaft 18 of transmission oil pump 16 is instead coupled with sun gear 34. As a result, in contrast to the embodiment of drive train 10 depicted in FIG. 2, no increased ratio but rather a reduction is provided by planetary gear set 30. The order of freewheel 20 and centrifugal clutch 22 can also be exchanged.

Figure 4:
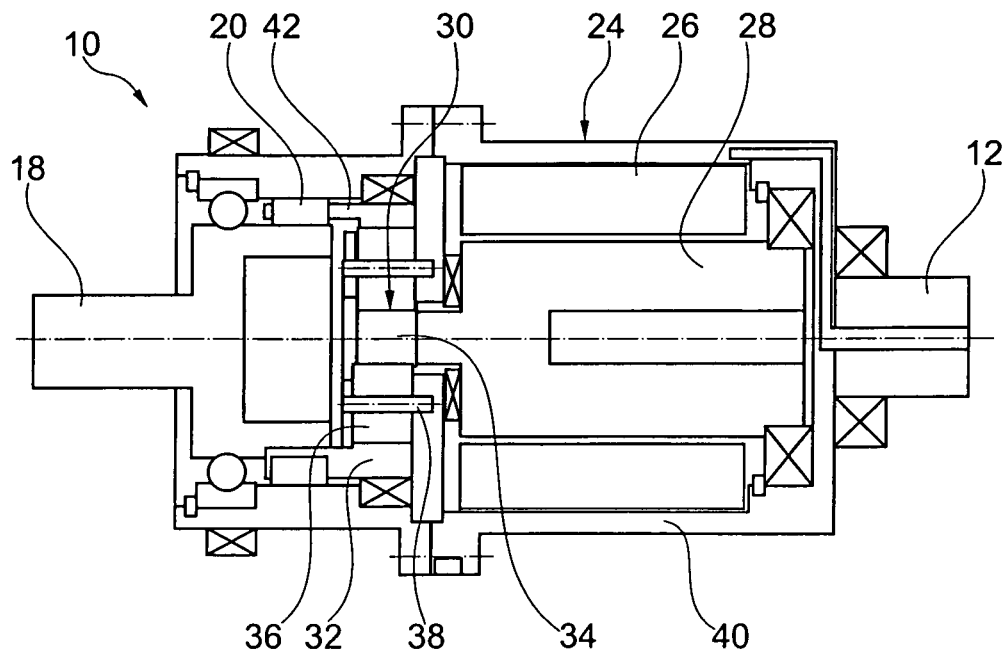
FIG. 4: a schematic cross-sectional view of a part of a drive train according to another embodiment of the present invention.

In the embodiment of drive train 10 depicted in FIG. 4, in comparison to the embodiment of drive train 10 depicted in FIG. 3, rotor 28 of electrical machine 24 is connected to sun gear 34, while stator 26 is connected to planet carrier 38 by means of a housing 40, which also rotates. Pump shaft 18 of transmission oil pump 16 is coupled with ring gear 32 of planetary gear set 30 by means of a switchable freewheel 20. Instead of a centrifugal clutch 22, a switching cage 42 connected to ring gear 32 is provided as the switching element, which locks or unlocks the switchable freewheel 20.

Figure 5:
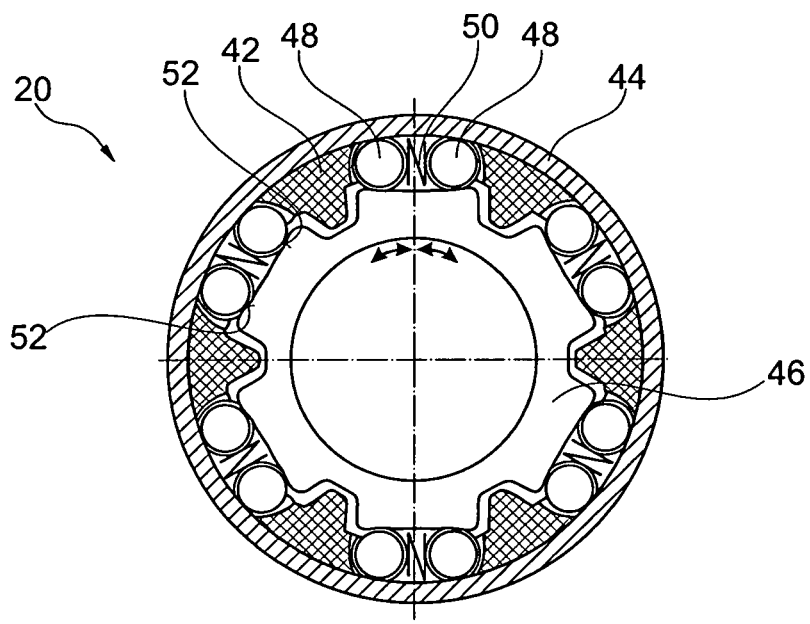
FIG. 5: a schematic cross-sectional view of a switchable freewheel of the drive train of FIG. 4 in a locked operating state.
Figure 6:
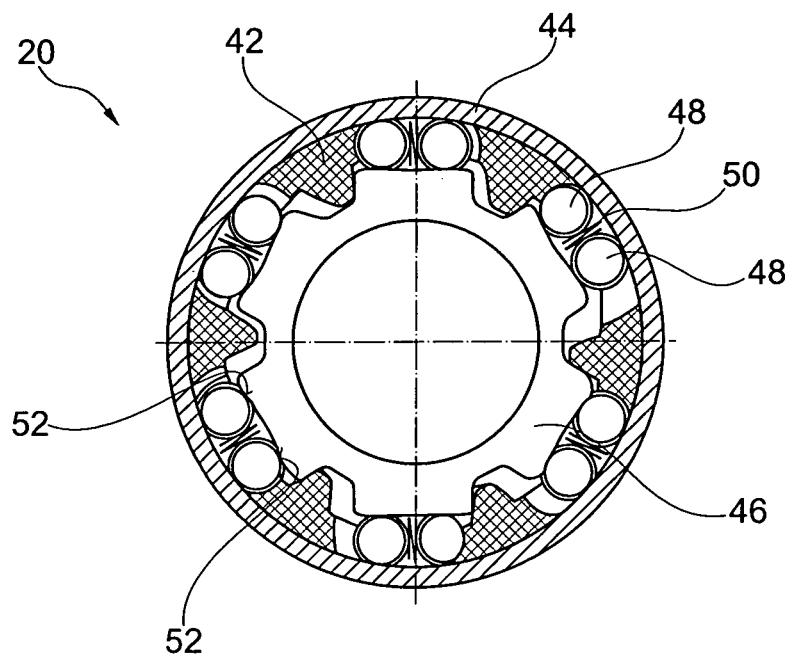
FIG. 6: a schematic cross-sectional view of a switchable freewheel of the drive train of FIG. 4 in an unlocked operating state.

The switchable freewheel 20 depicted in FIG. 5 and FIG. 6 has an outer ring 44 and an inner ring 46, between which clampable rollers 48 are situated. Two rollers 48 in each case are pressed apart from each other by means of a spring 50 situated between two adjacent rollers 48, so that in the locked state (FIG. 5) the rollers are clamped by means of a ramp 52 between outer ring 44 and inner ring 46. This makes a power stream possible between outer ring 44 and inner ring 46. When electrical machine 24 is activated, switching cage 42 is moved relative to outer ring 44 in the circumferential direction, so that switching cage 42 presses the corresponding rollers 48 down from ramp 52 in the respective circumferential direction, whereby the power stream between outer ring 48 and inner ring 46 is interrupted (FIG. 6). Since switching cage 42 can strike inner ring 46 in the circumferential direction, a power stream is provided from electrical machine 24 through switching cage 42 and inner ring 46 to transmission pump 16.

The invention claimed is:

1. A drive train for a hybrid motor vehicle, said drive train comprising: a drive shaft connected to an internal combustion engine, a transmission oil pump coupled with the drive shaft by a switchable freewheel, and an electrical machine for selectively driving the pump, wherein the electrical machine is arranged in a power flow direction between the drive shaft and the pump, and the electrical machine is in parallel to the freewheel in the power flow direction, including a switching element downstream of the electrical machine in the power flow direction and situated in series with the freewheel in the power flow direction, and wherein the series connected switching element and the freewheel are together situated in parallel to the electrical machine in the power flow direction.

2. The drive train according claim 1, wherein a rotational speed ratio of drive shaft rotational speed relative to a pump shaft rotational speed is increased or is reduced ahead of the pump in the power flow direction.

3. The drive train according to claim 1, wherein the freewheel disengages to interrupt flow of power from the drive shaft to the pump when a drive shaft speed is lower than a speed of a pump shaft that is coupled to the drive shaft by the freewheel, and the freewheel engages to provide a flow of power from the drive shaft to the pump shaft when the speed of the drive shaft is higher than the speed of the pump shaft.

4. The drive train according to claim 1, wherein the switching element is a centrifugal clutch.

5. The drive train according to claim 1, wherein the switching element is closed below a predetermined speed $n_{limit}$ of the drive shaft to provide a flow of power between the drive shaft and the freewheel, and is opened above the predetermined speed $n_{limit}$ of the drive shaft to interrupt a flow of power between the drive shaft and the freewheel.

6. The drive train according to claim 5, wherein the predetermined speed $n_{limit}$ of the drive shaft is chosen so that a predefined maximum necessary pump power of the pump is reached at the predetermined speed $n_{limit}$ of the drive shaft.

7. The drive train according to claim 1, wherein the drive shaft is coupled with the pump by a planetary gear set for varying the pump rotational speed.

8. The drive train according to claim 7, wherein the drive shaft is connected to a ring gear of the planetary gear set, the electrical machine is connected to the ring gear and to a sun gear of the planetary gear set, and the pump is connected to a planet carrier of the planetary gear set.

9. The drive train according to claim 7, wherein the freewheel and a switching element provided in series with the freewheel are connected to the electrical machine in parallel to the planetary gear set.

10. The drive train according to claim 7, wherein the drive shaft is connected to a ring gear of the planetary gear set, the electrical machine is connected to the ring gear and to a planet carrier of the planetary gear set, and the pump is connected to a sun gear of the planetary gear set.

11. The drive train according to claim 10, wherein the freewheel and the switching element provided in series with the freewheel are connected in parallel to the planetary gear set.

\* \* \* \* \*